(12) United States Patent
Desai (10) Patent No.: US 6,701,065 B1
(45) Date of Patent: Mar. 2, 2004

(54) METHODS AND APPARATUS FOR BUFFERING INFORMATION PRIOR TO DECODING

(75) Inventor: Pratish R. Desai, Fremont, CA (US)

(73) Assignee: Genesis Microchip, Inc., Alviso, CA (US)

(*) Notice: Subject to any disclaimer, the term of this patent is extended or adjusted under 35 U.S.C. 154(b) by 0 days.

(21) Appl. No.: 09/477,983

(22) Filed: Jan. 5, 2000

(51) Int. Cl.[7] .............................. H04N 7/26; H04N 5/85; H04N 7/04
(52) U.S. Cl. ..................... 386/109; 386/125; 386/105
(58) Field of Search ................................ 386/109, 111, 386/112, 27, 33, 125, 126, 96, 104, 105, 106, 45, 39, 46, 124, 40; H04N 7/26, 5/85, 7/04

(56) References Cited

U.S. PATENT DOCUMENTS 6,597,861 B1 * 7/2003 Tozaki et al.

FOREIGN PATENT DOCUMENTS

EP  0730272  *  4/1996

* cited by examiner

*Primary Examiner*—Robert Chevalier
(74) *Attorney, Agent, or Firm*—Beyer Weaver & Thomas, LLP (57) ABSTRACT

A system for processing information, such as audio/video information utilized in a DVD player, can be implemented without the need for a buffer, such as a track buffer, located between the source of audio/video information and the demultiplexer which parses a packet of data. The packet of data can then be parsed into audio, video, subpicture, or navigation, portions and stored for decoding. In one embodiment, a DVD player utilizes a circuit that is synchronized to the speed of the DVD drive rather than to the speed of the decoders for each portion of data.

23 Claims, 7 Drawing Sheets

| Sector 304 | Audio Packet Header 308 | Audio Data 312 | Sector 316 | Video Packet Header 320 | Video Data 324 | Sector 328 | Sub-picture Packet Header 332 | Sub-picture Data 336 | Sector 340 | Navigation Packet Header 344 | Navigation Data 348 |

METHODS AND APPARATUS FOR BUFFERING INFORMATION PRIOR TO DECODING

BACKGROUND OF THE INVENTION

This invention relates generally to the field of processing digital data used in the field of consumer electronics. More particularly, this invention relates to the demultiplexing and storage of digital data for use in audio visual equipment.

Digital information for use by audio-visual equipment is often transmitted in packets. Often the packets are organized according to one of the many standards that have been established by various technology standards committees. For example, MEPG-2 is a standard that is used in the telecommunications industry. The way in which the packets of information are handled is important, because it impacts the speed at which data can be transmitted and the resulting operations which can be performed on the audio visual data. For example, the ability to transmit a frame from a movie at a fast rate permits additional operations to be performed on the frame without impacting the speed at which the movie is shown.

One type of device used in the telecommunications or consumer electronics industry is the Digital Video Disc (DVD) player. DVD players in the past have relied on a buffer, known as a track buffer, to store data as the data is read from the DVD disk. The information is then stored in the buffer until each packet of DVD data can be parsed into its subcomponents. Once the data is parsed into its subcomponents, such as an audio portion, a video portion, a subpicture portion, and a navigation portion, it can be stored for later decoding and processing.

A drawback to prior DVD players has been that the track buffer was required prior to the data being parsed. This has been due to the fact that prior hardware designs have focused on the decoder speed as the determining factor in the hardware design. As a result, when data is read from a DVD disc, it must be stored until the decoder(s) are finished processing the preceding data.

A further drawback to such designs is that the additional component of a track buffer is required prior to the demultiplexing of data. This serves as an additional component which the data must travel through and which can possibly corrupt the data signal being read from the DVD disc. Furthermore, it adds to the cost and weight of the DVD player.

Hence, there is a need for a design that does not require the use of a track buffer for storage of data prior to the parsing of the data. Furthermore, there is a need for a simpler design that reduces the number of components for processing of DVD data.

SUMMARY OF THE INVENTION

The present invention provides a system to overcome these disadvantages and satisfy the needs highlighted by other designs. The system of the present invention provides an input to receive data from a drive of a DVD player; a demultiplexer to parse the data, without the need for a track buffer between the DVD disc and the demultiplexer. Furthermore, the invention is capable of receiving a data stream from a DVD disc, wherein the datastream is composed of audio data, video data, etc. all packetized into a standardized packet; demultiplexing the data stream to separate each of the data portions; while once again not requiring the use of a track buffer prior to the act of demultiplexing the data stream.

Further embodiments of the invention can be accomplished by using track buffer(s) coupled to the output of the demultiplexer and decoder(s) to decode each respective data portion. Separate track buffers can be used for each respective portion of data, e.g., an audio track buffer, a video track buffer, a subpicture track buffer, and a navigation track buffer. The track buffer(s) can be stored in random access memory, such as Synchronized Dynamic Random Access Memory (SDRAM).

In accordance with another embodiment of the invention, the decoding of data is synchronized to the speed of the DVD drive so as to eliminate the need for an additional data storage device.

Other and further advantages and features of the invention will be apparent to those skilled in the art from a consideration of the following description taken in conjunction with the accompanying drawings wherein certain methods of and installations for practicing the invention are illustrated. However, it is to be understood that the invention is not limited to the details disclosed but includes all such variations and modifications as fall within the'spirit of the invention and the scope of the appended claims.

DESCRIPTION OF THE SPECIFIC EMBODIMENTS

Figure 1:
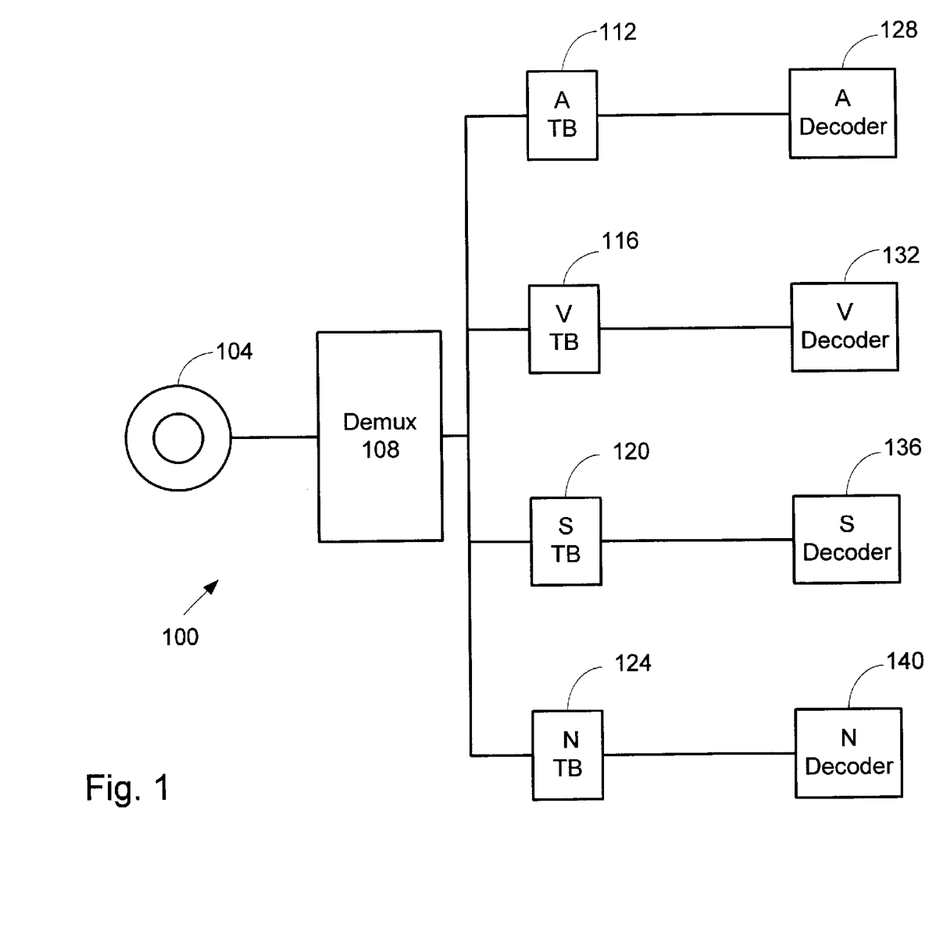
FIG. 1 is a block diagram of a circuit for demultiplexing and decoding data received from a digital source, such as a DVD disc.
Figure 5:
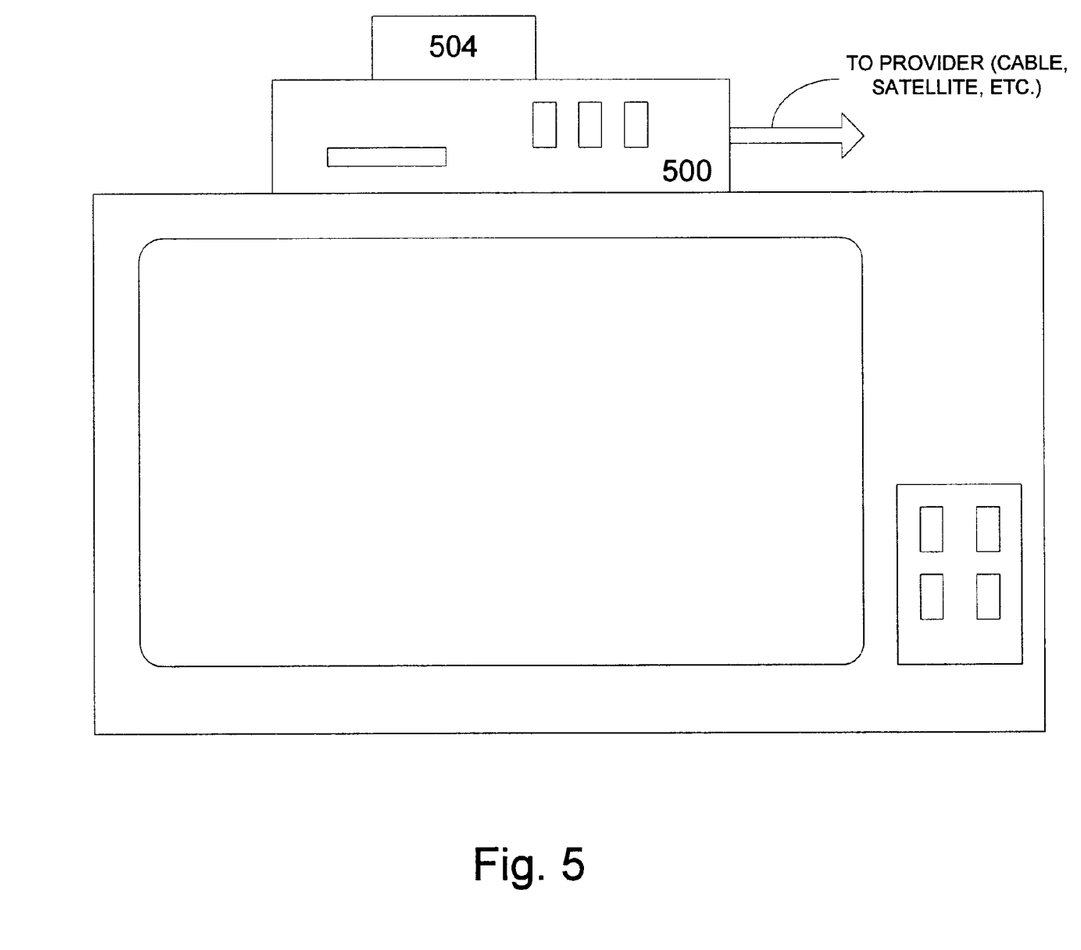
FIG. 5 is a typical end-user setting where audio/visual information is received, including a television, a DVD player and a set-top box.

Referring now to the figures and more particularly to FIG. 1, a circuit 100 showing one embodiment of the invention can be seen. The circuit in FIG. 1 is a circuit that could be used in many different telecommunications devices that process data received from a digital source. However, it is considered to have particular applicability for use in DVD players that play DVD discs. Such a DVD player is shown in FIG. 5. FIG. 5 shows a television and DVD player 500. Also shown in FIG. 5 is a set-top box 504 which receives packetized data from a cable television company. The set-top box is yet another source of digital data with which the circuit shown in FIG. 1 could be used.

FIG. 1 shows a DVD player 104 that is coupled to a demultiplexer 108. The demultiplexer 108 receives a digital data stream from the DVD player 104 for parsing. The output of the demultiplexer 108 is coupled to track buffer(s). While it is not necessary to use several track buffers, four track buffers are shown in FIG. 1. In the example demonstrated in this patent, the digital data stream is made up of an audio portion which corresponds to the sound for a DVD program, a video portion which corresponds to the picture of the DVD program, a subpicture portion which corresponds to a subpicture element, and a navigation portion containing navigation information. Consequently, an audio track buffer 112, a video track buffer 116, a subpicture track buffer 120 and a navigation track buffer 124 are shown coupled to the output of the demultiplexer. Each of these track buffers is shown coupled to a corresponding decoder, namely audio decoder 128, video decoder 132, subpicture decoder 136, and navigation decoder 140.

Figure 2:
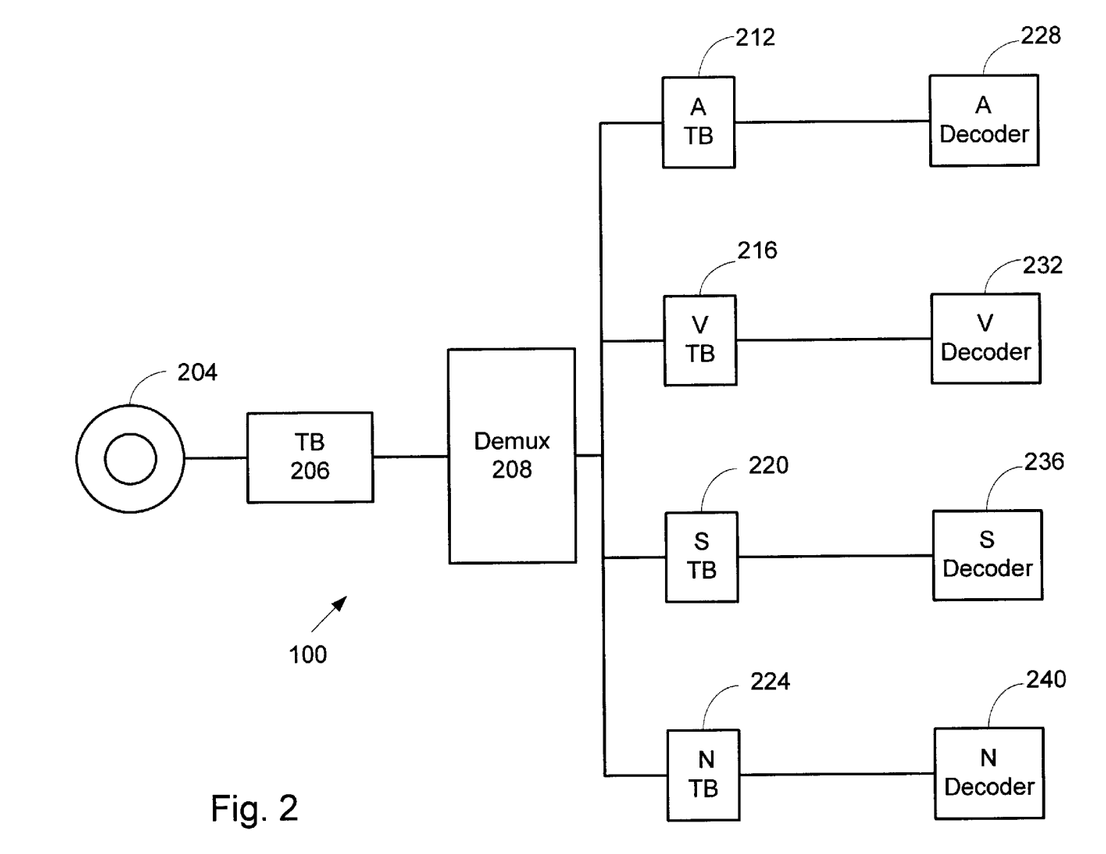
FIG. 2 is a block diagram of a conventional circuit used for demultiplexing and decoding data received from a digital source.

Comparing the circuit of FIG. 1 to the conventional circuit 200 used in conventional DVD players highlights how the circuit in FIG. 1 does not utilize a track buffer 206 located between the DVD drive 204 and the demultiplexer 208. Thus the. circuit in FIG. 1 is advantageous in that it does not require the extra component or memory of track buffer 206. This is advantageous at least for the reason that it is less expensive, reduces the need for extra memory, and/or simplifies the circuitry. Furthermore, it reduces the possibility of an error being introduced into the data stream by inputting and outputting the data into track buffer 206.

One advantage of the invention is that it provides for faster processing of data received from a DVD disc. The demultiplexer 108 is operated at a speed that is synchronized to the speed of the output from the DVD disc. Hence, as data is output from the DVD disc, the data can be parsed by the demultiplexer and stored in the respective buffers for decoding. Thus, the need for a track buffer located between the DVD disc and the demultiplexer is removed when the demultiplexer can operate at a rate that does not result in a backup of data. In contrast, conventional designs were based on the speed of a decoder. Hence, when a slow decoder was selected, the demultiplexer did not have to operate quickly enough to keep pace with the output from the DVD disc drive. Consequently, there has been a need for the large track buffer in conventional designs. As noted above, this need is eliminated when the demultiplexer is operated at a speed that keeps pace with the output of the DVD drive.

The track buffers shown in FIG. 1 can be individual buffer elements or memory. Preferably, however, the track buffers 112, 116, 120, and 124 are disposed in RAM such as Synchronized Dynamic Random Access Memory (SDRAM).

Figure 4:
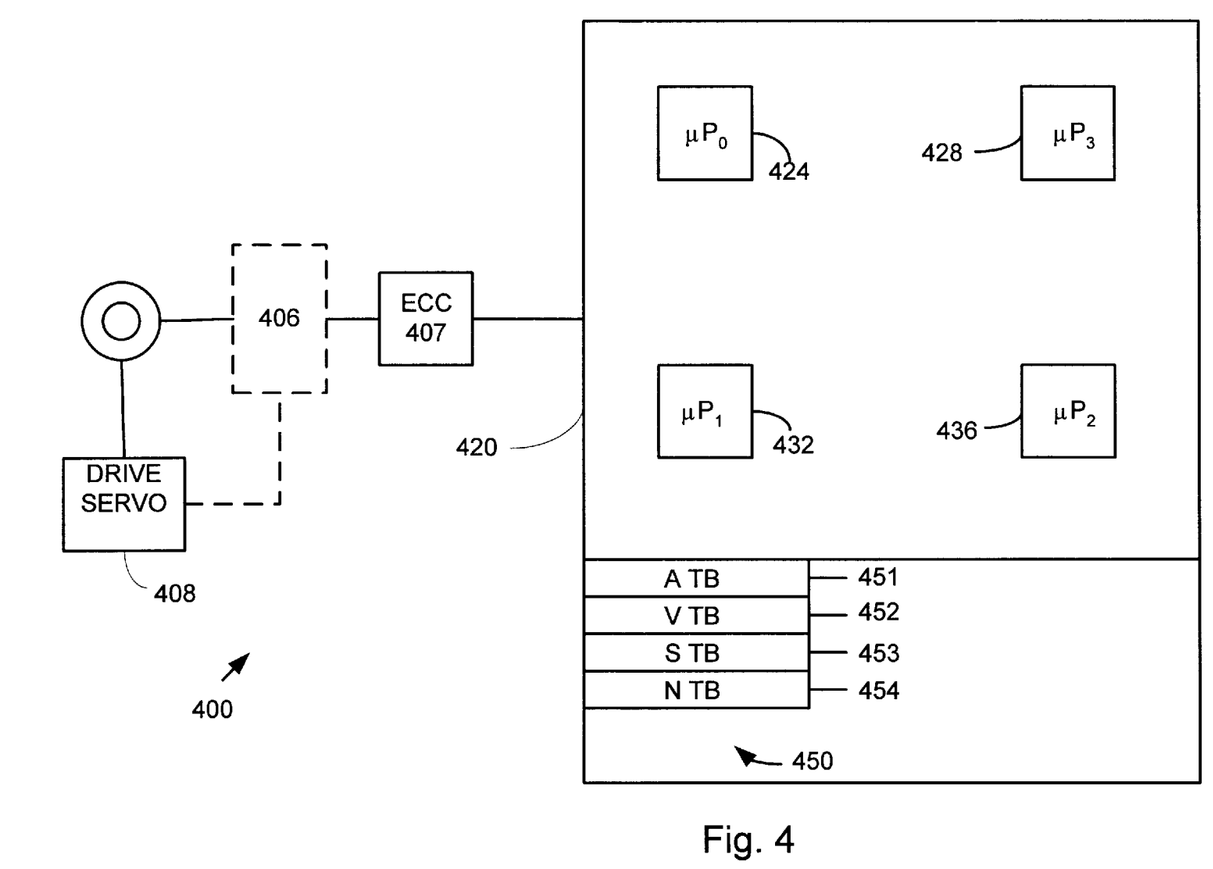
FIG. 4 is a block diagram of a circuit used in a DVD player for processing of digital data read from a disc drive.

Turning now to FIG. 4 an additional embodiment of the invention can be seen. In the circuit 400 of FIG. 4, a DVD drive 404 is shown coupled to a DVD drive servo 408. The output of the DVD drive is coupled to an error checking and correction (ECC) component 407. The ECC component can be a separate component or part of a complete system on a chip design. The output of the ECC component in FIG. 4 is connected to a circuit 420. This particular circuit is shown having four processors. However, it should be understood that other implementations might use more or fewer processors. A coded data interface (not shown) accepts data from the ECC. A demultiplexer processor 432 receives the data stream and demultiplexes the data stream. The demultiplexed data is parsed into its respective components such that an audio portion is stored in the audio buffer 451, a video portion is stored in the video buffer 452, a subpicture portion is stored in a subpicture buffer 453 and a navigation portion is stored in a navigation buffer 454.

In addition to the demultiplexer processor 432, circuit 420 also is shown as comprised of an audio decoder processor 424, a video decoder processor 436, and a subpicture and navigation decoder processor 428. These processors are coupled to memory 450 to allow the respective data portions to be accessed and processed, e.g., decoded and output for broadcast, etc.

FIG. 4 shows in dashed lines an element which has been eliminated from the design. Namely, the conventional track buffer 406 which corresponds to track buffer 206 in FIG. 2, is unnecessary for the design of FIG. 4. Hence, the dashed lines indicate that it is not present in the circuit. However, this highlights an advantage of this embodiment of the invention in that the need for the track buffer 406 has been removed by this design.

In addition to the use of the invention with a DVD player, it could also be used in other environments where a stream of data is received. For example, it could be used with a set-top box for receiving data in MPEG format. Similarly, it could be used in receiving data from a computer network, such as the Internet. Other uses will be understood by those of ordinary skill in the art, as well.

Figure 3:
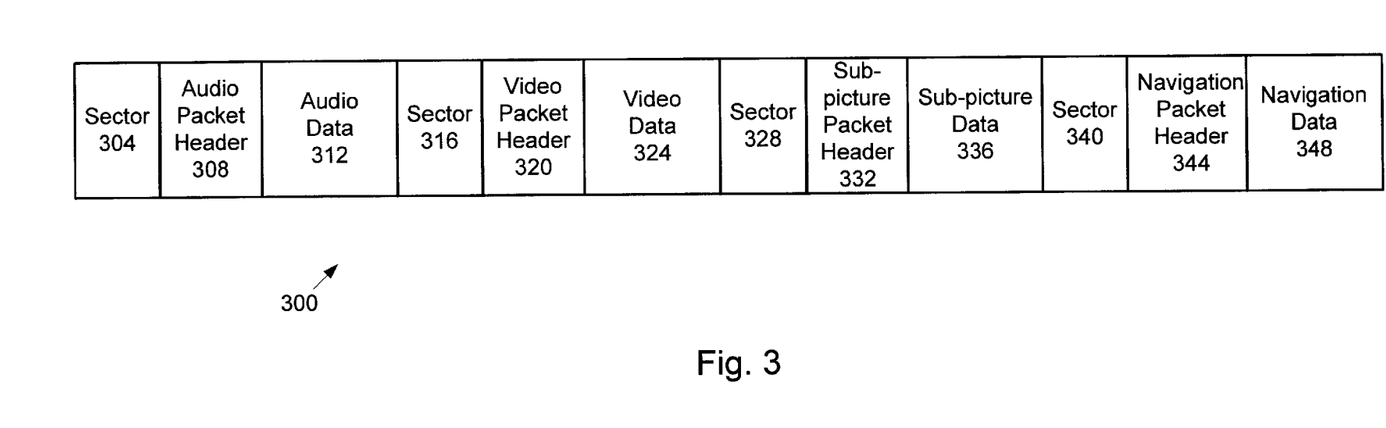
FIG. 3 is an example of a packet of data used in the telecommunications industry for conveying a representation of audio/visual information.

FIG. 3 shows an example of how data can be packaged from an output of a DVD drive. Data packet 300 is shown as having a sector block 304 followed by an audio packet header block 308 and audio data payload 312. The sector block 304 identifies where on the DVD disc the data is located. This is useful in processing the data and checking for errors. The audio packet header block 308 indicates the start of the audio data. Finally, the audio data payload contains the content information for an audio signal. Similarly, a second sector block 316 follows audio data payload 312. This is then followed by video packet header block 320 and video data payload 324. This information serves functions corresponding to the respective audio blocks. Following the video information is a third sector block 328, a subpicture packet header block 332, and a subpicture data payload 336. Finally, the navigation data completes the packet. It contains a sector block 340, a navigation packet header block 344, and a navigation data payload 348.

Figure 6A:
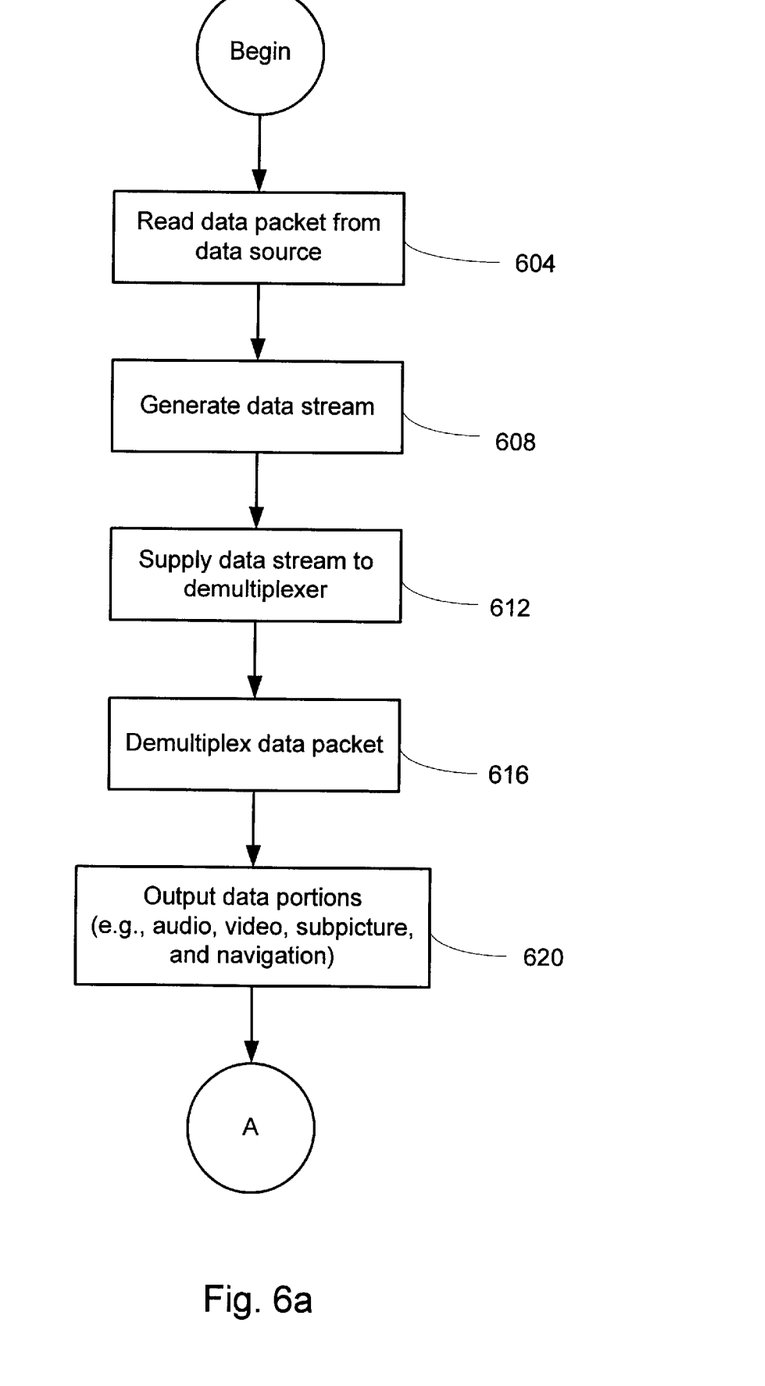
FIGS. 6a and 6b are a flowchart showing the process of obtaining audio/visual information, parsing it into its sub-components, and processing the respective sub-components.
Figure 6B:
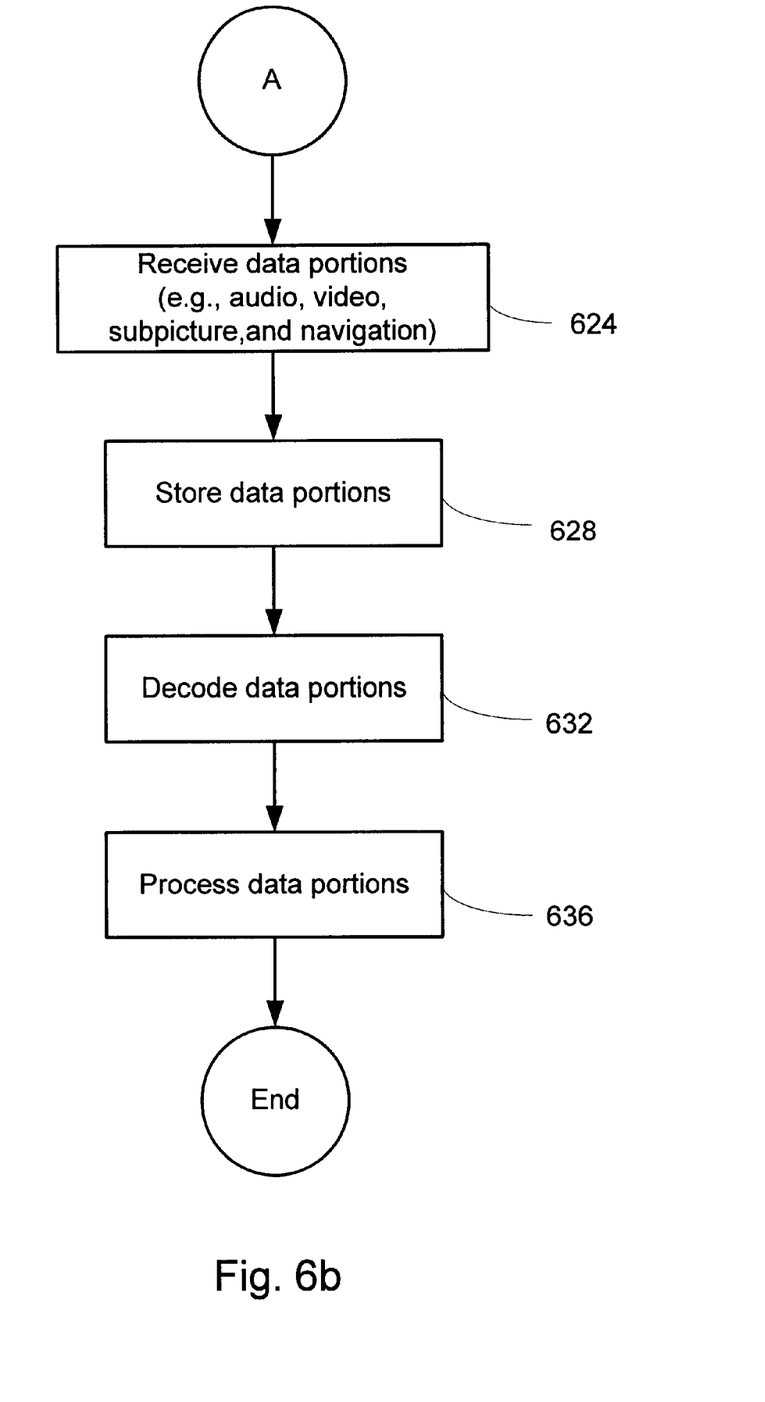

The operation of one embodiment of the invention can be seen with reference to FIGS. 6a and 6b and FIG. 4. FIG. 6a shows that a data packet, such as data packet 300 shown in FIG. 3, is read from a data source 604. As mentioned earlier, this data source could be one of many different sources; however, for purposes of this example a DVD disc is used. Hence a DVD drive reads the data from the DVD disc and generates a data stream 608. The data stream is then supplied to a demultiplexer 612 to have the data stream demultiplexed into its component parts. Prior to the demultiplexing, however, the data stream can be checked for errors and corrected, as shown by element 407 in FIG. 4.

To accomplish the demultiplexing, a processor such as processor 432 can be used. This processor operates at a speed fast enough to keep pace with the rate of the data stream. Hence, by utilizing a processor to serve as the demultiplexer in place of a separate demultiplexer hardware component, the demultiplexer can be operated at the speed of the data source. Thus, the software for the processor can be programmed such that the processor operates at a speed that accommodates the flow of data from the data source, e.g., the DVD drive. This type of operation would be understood by those of ordinary skill in the art as demultiplexing the data in real time or "on the fly" such that no data backlog develops.

The demultiplexer then demultiplexes the data packet 616. In FIG. 4, this is performed by processor 432. Referring to FIG. 3, it can be seen that where that type of data packet is used that the data is divided into four portions, namely the payload data for audio, video, subpicture, and navigation. To achieve the demultiplexing of this data packet, the processor 432 pulls out the sector data for each payload. It performs an error check by confirming that the sector data corresponds with the location that the data is expected to come from. For example, it confirms that if the audio data in the prior packet came from sector "X" that the audio data in the packet being processed came from sector "X+1." The processor then strips off the header information and stores the payload data in a memory buffer, such as in memory 450 in FIG. 4. The memory should preferably be memory with a short access time such as SDRAM. This allows for the stored data to be accessed and processed quickly by a decoder. This process is repeated for each of the payload portions. Hence, the audio data is stripped down such that the audio payload can be stored in an audio track buffer 451. The video, subpicture and navigation data is similarly parsed such that it is stored in track buffers 452, 453, and 454. Therefore, the data portions are output 620 to their respective storage locations.

Following the demultiplexing of the data packet, the data portions are received at the track buffers 624 corresponding with each data portion. In turn, they are then stored 628.

Once the data has been demultiplexed into its respective data portions and stored, it is decoded 632. It should be understood that storage is not a necessity if the decoder can operate at a speed that keeps pace with the output from the demultiplexer. In FIG. 4, processor 424 serves to decode the audio data portion stored in memory location 451. Typically, data will be encoded or compressed; hence, the processor 424 will perform the algorithms that provide for decoding and/or decompression of the data such that the data can be broadcast through an output device. This additional manipulation of the data beyond decoding the data is considered to be the processing of the data 636 as shown in FIG. 6b.

In addition to processor 424, a video processor 436 acts as a decoder to decode the video data stored in memory location 452. The separation of the audio processing and the video processing allows for fast manipulation of these data portions. The audio processor is able to focus on the processing routines required to decode and process the audio material while the video processor is able to focus on the routines required to decode and process the video material. A third processor 428 is utilized to decode and process the subpicture and navigation data. Again, it is envisioned that fewer or more processors could be utilized to accomplish this processing of the data. However, the combination of the subpicture processing with the navigation data processing, serves as a preferred tradeoff between processing capabilities and cost, size, and additional circuitry. In addition to the decoding and processing of the navigation and subpicture data, processor 428 can be utilized to perform system functions for the integrated circuit 420. For example, it can be used to accomplish timing management, BIOS, GUI, etc. Further information can be seen by reference to "DVD Demystified" by Jim Taylor, McGraw Hill publisher, copyright 1998, the content of which is hereby incorporated by reference in its entirety for all that it discloses.

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. An apparatus for buffering data, comprising:
   an input to receive data from a drive of a DVD player;
   a demultiplexer operable to demultiplex a packet of data received from said DVD player, said demultiplexer having an input and an output and synchronized to a data output speed of said drive of said DVD player so as not to require a track buffer prior to demultiplexing said data; and
   at least one track buffer coupled to said demultiplexer output and operable to store a portion of said data.

2. The apparatus as described in claim 1 and further comprising:
   at least one decoder coupled to an output of said decoder and operable to decode said data.

3. The apparatus as described in claim 1 and further comprising a DVD drive.

4. The apparatus as described in claim 1 wherein said data comprises:
   an audio portion;
   a video portion;
   a subpicture portion; and
   a navigation portion; and wherein said demultiplexer demultiplexes the audio portion, video portion, subpicture portion and navigation portion.

5. The apparatus as described in claim 1 and further comprising:
   an audio track buffer;
   a video track buffer;
   a subpicture track buffer; and
   a navigation track buffer.

6. The apparatus as described in claim 5 wherein said audio track buffer, video track buffer, subpicture track buffer, and navigation track buffer are stored in RAM.

7. The apparatus as described in claim 6 wherein said RAM is Synchronized Dynamic Random Access Memory.

8. The apparatus as described in claim 1 and further comprising a microprocessor, said microprocessor operable to process said data.

9. The apparatus as described in claim 1 wherein said at least one track buffer is an audio track buffer and further comprising: a video track buffer;
   a subpicture track buffer; and
   a navigation track buffer;
   a first processor operable to process data stored in said audio track buffer;
   a second processor operable to process data stored in said video track buffer; and
   a third processor operable to process data stored in said subpicture track buffer and in said navigation track buffer.

10. A DVD player comprising:
a DVD drive for holding a DVD disk, said DVD disk containing data packets having sector data, audio packet header data, audio payload data, video packet header data, video payload data, subpicture header data, subpicture payload data, navigation packet header data, and navigation payload data;
an input to receive data from said DVD drive;
a demultiplexer coupled to said input and operable to demultiplex a packet of data received from said DVD drive, said demultiplexer synchronized to a data output speed of said DVD drive so as not to require a track buffer prior to demultiplexing said data;
an audio track buffer;
a video track buffer;
a subpicture track buffer; a navigation track buffer;
an audio data decoder coupled to said audio track buffer;
a video data decoder coupled to said video track buffer;
a subpicture data decoder coupled to said subpicture track buffer; and a navigation data decoder coupled to said navigation track buffer.

11. A method of processing data, said method comprising:
receiving a data stream from a DVD drive, said data stream comprising at least an audio data portion and a video data portion;
demultiplexing said data stream so as to separate said audio data portion and said video data portion wherein said demultiplexing said data stream comprises demultiplexing said data stream in real time so that said demultiplexing is synchronized to an output rate from said DVD drive so as not to require a track buffer prior to demultiplexing said data;
receiving said demultiplexed audio data portion at an audio track buffer; and
receiving said demultiplexed video data portion at a video track buffer.

12. The method as described in claim 11 and further comprising: decoding said audio data portion with an audio decoder, and decoding said video data portion with a video decoder.

13. The method as described in claim 11 wherein said data stream further comprises a subpicture data portion and a navigation data portion and further comprising:
receiving said demultiplexed subpicture data portion at a subpicture track buffer;
decoding said subpicture data portion with a subpicture decoder; receiving said demultiplexed navigation data portion at a navigation track buffer; and
decoding said navigation data portion with a navigation decoder.

14. The method as described in claim 11 and further comprising: utilizing RAM for said audio track buffer and video track buffer.

15. The method as described in claim 14 and further comprising utilizing Synchronized Dynamic Random Access Memory.

16. The method as described in claim 11 and further comprising a first microprocessor operable to process said audio data.

17. The method as described in claim 16 and further comprising a second microprocessor operable to process said video data.

18. A method of processing data in a DVD player, said method comprising:
obtaining data from a DVD drive so as to generate a data stream;
supplying said data stream to a demultiplexer;
demultiplexing said data stream in real time so that said demultiplexing is synchronized to an output rate from said DVD drive so as not to require a track buffer prior to demultiplexing said data, wherein said demultiplexing serves to separate said data stream into an audio data portion, a video data portion, a subpicture data portion, and a navigation data;
outputting said audio data portion to an audio track buffer disposed in RAM;
outputting said video data portion to a video track buffer disposed in RAM;
outputting said subpicture data portion to a subpicture track buffer disposed in RAM;
outputting said navigation data portion to a navigation track buffer disposed in RAM; and
decoding said audio data portion, video data portion, subpicture data portion, and navigation data portion.

19. Computer program product for processing data, said method comprising:
computer code for receiving a data stream from a DVD drive, said data stream comprising at least an audio data portion and a video data portion;
computer code for demultiplexing said data stream so as to separate said audio data portion and said video data portion wherein said demultiplexing said data stream comprises demultiplexing said data stream in real time so that said demultiplexing is synchronized to an output rate from said DVD drive so as not to require a track buffer prior to demultiplexing said data;
computer code for receiving said demultiplexed audio data portion at an audio track buffer;
computer code for receiving said demultiplexed video data portion at a video track buffer, and
computer readable medium for storing the computer code.

20. The computer program product as described in claim 19 and further comprising:
decoding said audio data portion with an audio decoder; and decoding said video data portion with a video decoder.

21. The computer program product as described in claim 19 wherein said data stream further comprises a subpicture data portion and a navigation data portion and wherein the computer program product further comprises:
computer code for receiving said demultiplexed subpicture data portion at a subpicture track buffer;
computer code for decoding said subpicture data portion with a subpicture decoder;
receiving said demultiplexed navigation data portion at a navigation track buffer; and
computer code for decoding said navigation data portion with a navigation decoder.

22. The computer program product as described in claim 19 and further comprising:
computer code for utilizing RAM for said audio track buffer and video track buffer.

23. The computer program product as described in claim 22 and further comprising computer code for utilizing Synchronized Dynamic Random Access Memory.

* * * * *